(12) United States Patent
Kunal et al.

(10) Patent No.: US 8,920,915 B2
(45) Date of Patent: Dec. 30, 2014

(54) ARTICLES INCLUDING HIGH MELT FLOW INDEX RESINS

(71) Applicants: Kumar Kunal, Lynchburg, VA (US); Mark O. Mason, Covington, VA (US); Coray Harper, Lynchburg, VA (US); Thomas A Ebeling, Forest, VA (US)

(72) Inventors: Kumar Kunal, Lynchburg, VA (US); Mark O. Mason, Covington, VA (US); Coray Harper, Lynchburg, VA (US); Thomas A Ebeling, Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 13/941,977

(22) Filed: Jul. 15, 2013

(65) Prior Publication Data

US 2014/0051310 A1   Feb. 20, 2014

Related U.S. Application Data

(60) Provisional application No. 61/672,021, filed on Jul. 16, 2012.

(51) Int. Cl.
*B32B 27/04* (2006.01)
*C08K 3/40* (2006.01)
*B32B 5/02* (2006.01)

(52) U.S. Cl.
CPC .... *C08K 3/40* (2013.01); *B32B 5/02* (2013.01)
USPC ..................... 428/297.4; 428/299.4

(58) Field of Classification Search
USPC ................. 428/292.1, 297.4, 299.4
See application file for complete search history.

(56) References Cited

U.S. PATENT DOCUMENTS

| | | | | |
|---|---|---|---|---|
| 4,178,411 | A * | 12/1979 | Cole et al. | 428/451 |
| 4,863,995 | A | 9/1989 | Murakami | |
| 7,258,913 | B2 * | 8/2007 | Jo et al. | 428/292.1 |
| 7,524,894 | B2 * | 4/2009 | Sato et al. | 524/127 |
| 2002/0009941 | A1 | 1/2002 | Clark | |
| 2004/0081814 | A1 * | 4/2004 | Jo et al. | 428/292.1 |
| 2004/0102551 | A1 * | 5/2004 | Sato et al. | 524/115 |
| 2007/0196637 | A1 | 8/2007 | Good | |
| 2008/0070019 | A1 | 3/2008 | Good | |
| 2009/0155522 | A1 | 6/2009 | Raghavendran | |
| 2010/0010142 | A1 * | 1/2010 | Noh et al. | 524/451 |
| 2011/0117351 | A1 * | 5/2011 | Sauer et al. | 428/221 |
| 2013/0101822 | A1 | 4/2013 | Kunal | |
| 2013/0172444 | A1 * | 7/2013 | Shin et al. | 523/223 |
| 2013/0311545 | A1 * | 11/2013 | Wright et al. | 709/202 |
| 2014/0045980 | A1 * | 2/2014 | Gerster et al. | 524/141 |
| 2014/0051310 | A1 * | 2/2014 | Kunal et al. | 442/1 |

OTHER PUBLICATIONS

IPRP for PCT/US13/50472 mailed on Dec. 17, 2013.

* cited by examiner

*Primary Examiner* — N. Edwards
(74) *Attorney, Agent, or Firm* — Rhodes IP PLC; Christopher R. Rhodes (57) ABSTRACT

Certain embodiments described herein are directed to composite materials comprising one or more high melt flow index resins. In some examples, the composites can be used to provide automotive parts such as, for example, vehicle interior parts and vehicle exterior parts. In some configurations, the composite comprises a fiber reinforced polymer core comprising reinforcing fibers and a resin comprising a high melt flow index of greater than 325 g/10 min. as measured by ASTM D1238, condition L.

24 Claims, 5 Drawing Sheets

ARTICLES INCLUDING HIGH MELT FLOW INDEX RESINS

PRIORITY APPLICATION

This application claim priority to U.S. Provisional Application No. 61/672,021 filed on Jul. 16, 2012, the entire disclosure of which is hereby incorporated herein by reference.

TECHNOLOGICAL FIELD

This application is related to articles that include one or more high melt flow index resins. In particular, certain embodiments described herein are directed to composite articles including a melt flow resin having a melt flow index of greater than 325 g/10 minutes as tested by ASTM D1238, condition L.

BACKGROUND

Articles for automotive and construction materials applications typically are designed to meet a number of competing and stringent performance specifications.

SUMMARY

In one aspect, a thermoplastic composite article comprising a fiber reinforced thermoplastic polymer core layer comprising reinforcing fibers and a resin, e.g., a thermoplastic resin, comprising a high melt flow index, e.g., one with a melt flow index greater than 100 g/10 min or greater than 325 g/10 min as measured by ASTM D1238, condition L is provided.

In certain embodiments, the core layer can be permeable and comprise a density of about 0.1 gm/cm$^3$ to about 1.8 gm/cm$^3$. In other embodiments, the core layer a porosity between about 20% to about 80% by volume of the core layer. In additional embodiments, the resin comprising a melt flow index greater than 325 g/10 min. comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof. In some examples, the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof. In certain examples, the reinforcing fibers comprise glass fibers and the resin comprising the high melt flow index comprises polypropylene.

In some examples, the resin comprises a melt flow index greater than 325 g/10 min and less than 750 g/10 min. as measured by ASTM D1238, condition L. In other examples, the resin comprises a melt flow index greater than or equal to 750 g/10 min. and less than 1000 g/10 min. as measured by ASTM D1238, condition L. In further examples, the resin comprises a melt flow index greater than 1000 g/10 min. and less than 1250 g/10 min. as measured by ASTM D1238, condition L. In additional embodiments, the resin comprises a melt flow index greater than or equal to 1250 g/10 min. as measured by ASTM D1238, condition L.

In another aspect, a thermoplastic composite article comprising a fiber reinforced thermoplastic polymer core layer comprising reinforcing fibers and a thermoplastic resin comprising a melt flow index greater than 325 g/10 min. as measured by ASTM D1238, condition L is provided. In some embodiments, the composite article also includes at least one surface layer disposed on a surface of the fiber reinforced thermoplastic polymer core layer.

In certain examples, the core layer is permeable and comprises a density of about 0.1 gm/cm$^3$ to about 1.8 gm/cm$^3$. In other examples, the core layer comprises a porosity between about 20% to about 80% by volume of the core layer. In certain embodiments, the thermoplastic resin comprising a melt flow index greater than 325 g/10 min. comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof. In certain examples, the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof. In some embodiments, the surface layer comprises one or more of a fabric, a film, a scrim, and combinations thereof.

In certain examples, the thermoplastic resin comprises a melt flow index greater than 325 g/10 min. and less than 750 g/10 min. as measured by ASTM D1238, condition L. In some examples, the thermoplastic resin comprises a melt flow index greater than or equal to 750 g/10 min. and less than 1000 g/10 min. as measured by ASTM D1238, condition L. In other examples, the thermoplastic resin comprises a melt flow index greater than 1000 g/10 min. and less than 1250 g/10 min. as measured by ASTM D1238, condition L. In additional examples, the thermoplastic resin comprises a melt flow index greater than or equal to 1250 g/10 min. as measured by ASTM D1238, condition L. In further examples, the surface layer disposed on the core layer comprises a resin comprising a melt flow index of at least 100 g/10 min. In some embodiments, the surface layer disposed on the core layer comprises a resin comprising a melt flow index of at least 325 g/10 min.

In other embodiments, an additional surface layer can be disposed on an opposite surface of the core layer. In some embodiments, the surface layer disposed on the core layer comprises a resin comprising a melt flow index of at least 100 g/10 min, and the additional surface layer disposed on the opposite surface of the core layer comprises a resin comprising a melt flow index less than 100 g/10 min. In certain examples, the surface layer disposed on the core layer comprises a resin comprising a melt flow index of at least 100 g/10 min, and the additional surface layer disposed on the opposite surface of the core layer comprises a resin comprising a melt flow index of at least 100 g/10 min. In certain embodiments, the additional surface layer comprises one or more of a fabric, a film, a scrim, and combinations thereof. In certain examples, the surface layer and the additional surface layer comprise the same material. In certain embodiments, the thermoplastic core layer comprises a polypropylene resin comprising a melt flow index greater than 325 g/10 min as measured by ASTM D1238, condition L and the reinforcing fibers comprise glass fibers. In some embodiments, the basis weight of the article is between about 300 gsm and about 3000 gsm. In other embodiments, the article comprises a basis weight of about 10% less than a basis weight of a reference article comprising a resin with a melt flow index less of about 100 g/10 min, in which the article further comprises a substantially similar flexural slope in the machine direction or the cross direction or both as the reference article.

In an additional aspect, a composite article comprising a permeable fiber reinforced thermoplastic core layer comprising a plurality of reinforcing fibers bonded together with a thermoplastic resin comprising a melt flow index greater than 325 g/10 min as measured by ASTM D1238 is described.

In certain embodiments, the permeable core layer comprises a density of about 0.1 gm/cm3 to about 1.8 gm/cm3. In other embodiments, the article can include a first reinforcing layer disposed on a surface of the core layer. In some examples, the first reinforcing layer comprises a matrix of reinforcing fibers and a thermoplastic resin. In additional examples, the thermoplastic resin of the first reinforcing layer comprises a melt flow index greater than 325 g/10 min as measured by ASTM D1238. In further examples, the matrix of reinforcing fibers comprises fibers in a bidirectional orientation, e.g., bidirectionally oriented fibers present in a single layer or in multiple layers. In certain embodiments, the article can include a second reinforcing layer disposed on an opposite surface of the core layer. In some examples, the second reinforcing layer comprises a matrix of reinforcing fibers and a thermoplastic resin. In certain examples, the thermoplastic resin of the second reinforcing layer comprises a melt flow index greater than 325 g/10 min as measured by ASTM D1238. In other examples, the matrix of reinforcing fibers in each of the first reinforcing layer and the second reinforcing layer comprise fibers in a bidirectional orientation.

In another aspect, a pre-preg composition comprising a plurality of reinforcing fibers dispersed in a thermoplastic resin comprising a melt flow index greater than 325 g/10 min as measured by ASTM D1238 is disclosed.

In some embodiments, the loading weight of the resin is about 20-70 weight percent of the thermoplastic resin based on the weight of the pre-preg composition. In certain examples, the composition can include at least one additive. In certain embodiments, the thermoplastic resin comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof. In some examples, the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof. In other examples, the reinforcing fibers comprise glass fibers and the thermoplastic resin comprising the melt flow index greater than 325 g/10 min as measured by ASTM D1238 comprises polypropylene.

In certain examples, the thermoplastic resin comprises a melt flow index greater than 325 g/10 min. and less than 750 g/10 min. as measured by ASTM D1238. In other examples, the thermoplastic resin comprises a melt flow index greater than or equal to 750 g/10 min and less than 1000 g/10 min. as measured by ASTM D1238. In some examples, the thermoplastic resin comprises a melt flow index greater than 1000 g/10 min. and less than 1250 g/10 min. as measured by ASTM D1238. In additional examples, the thermoplastic resin comprises a melt flow index greater than or equal to 1250 g/10 min. as measured by ASTM D1238.

In another aspect, a thermoplastic composite article comprising a thermoplastic high melt flow index resin and reinforcing fibers dispersed in the resin, in which the high melt flow index resin is present in an effective amount to provide a basis weight/flexural slope (in the machine direction as measured by a Modified Flex Test method) ratio of less than 15 gsm-cm/N is provided. In another aspect, a thermoplastic composite article comprising a thermoplastic high melt flow index resin and reinforcing fibers dispersed in the resin, in which the high melt flow index resin is present in an effective amount to provide a basis weight/flexural slope (in the cross direction as measured by a Modified Flex Test method) ratio of less than 15 gsm-cm/N is provided. The Modified Flex Test method is a variant of ASTM D790 and is described in more detail herein.

In certain embodiments, the thermoplastic resin comprises a melt flow index greater than 325 g/10 min. and less than 750 g/10 min. as measured by ASTM D1238, condition L. In other embodiments, the thermoplastic resin comprises a melt flow index greater than or equal to 750 g/10 min. and less than 1000 g/10 min. as measured by ASTM D1238, condition L. In some examples, the thermoplastic resin comprises a melt flow index greater than 1000 g/10 min. and less than 1250 g/10 min. as measured by ASTM D1238, condition L. In additional examples, the thermoplastic resin comprises a melt flow index greater than or equal to 1250 g/10 min. as measured by ASTM D1238, condition L.

In an additional aspect, a thermoplastic composite article comprising a high melt flow index resin and reinforcing fibers dispersed in the resin, in which the high melt flow index resin is present in an effective amount to provide a basis weight/machine direction peak load ratio of less than about 66 gsm/N, e.g., less than 42 gsm/N is described.

In certain embodiments, the thermoplastic resin comprises a melt flow index greater than 325 g/10 min. and less than 750 g/10 min. as measured by ASTM D1238, condition L. In other embodiments, the thermoplastic resin comprises a melt flow index greater than or equal to 750 g/10 min. and less than 1000 g/10 min. as measured by ASTM D1238, condition L. In certain examples, the thermoplastic resin comprises a melt flow index greater than 1000 g/10 min. and less than 1250 g/10 min. as measured by ASTM D1238, condition L. In further examples, the thermoplastic resin comprises a melt flow index greater than or equal to 1250 g/10 min. as measured by ASTM D1238, condition L.

In another aspect, a thermoplastic composite article comprising a high melt flow index resin and reinforcing fibers dispersed in the resin, in which the high melt flow index resin is present in an effective amount to provide a basis weight/cross direction peak load ratio of less than 90 gsm/N is disclosed.

In certain examples, the thermoplastic resin comprises a melt flow index greater than 325 g/10 min. and less than 750 g/10 min. as measured by ASTM D1238, condition L. In other examples, the thermoplastic resin comprises a melt flow index greater than or equal to 750 g/10 min. and less than 1000 g/10 min. as measured by ASTM D1238, condition L. In additional examples, the thermoplastic resin comprises a melt flow index greater than 1000 g/10 min. and less than 1250 g/10 min. as measured by ASTM D1238, condition L. In other embodiments, the thermoplastic resin comprises a melt flow index greater than or equal to 1250 g/10 min. as measured by ASTM D1238, condition L.

In an additional aspect, a method comprising adding reinforcing fibers and a polymer resin comprising a high melt flow index to an agitated liquid-containing foam to form a dispersed mixture of polymer resin and reinforcing fibers, depositing the dispersed mixture of reinforcing fibers and polymer resin onto a forming support element, evacuating the liquid to form a web, heating the web above the softening temperature of the polymer resin, and compressing the web to a predetermined thickness to form the polymer material is provided.

In certain embodiments, the method can include disposing a surface layer on the compressed web. In some examples, the method can include selecting a polymer resin comprising a melt flow index greater than 325 g/10 min. and less than 750 g/10 min. as measured by ASTM D1238, condition L. In other examples, the method can include selecting a polymer resin comprising a melt flow index greater than or equal to 750 g/10 min and less than 1000 g/10 min. as measured by ASTM D1238, condition L. In additional examples, the method can include selecting a polymer resin comprising a melt flow index greater than 1000 g/10 min. and less than 1250 g/10 min. as measured by ASTM D1238, condition L.

In another aspect, a method of facilitating formation of a vehicle part, the method comprising providing a composite material comprising a fiber reinforced polymer core comprising reinforcing fibers dispersed in a polymer resin comprising a melt flow index of greater than 325 g/10 min. as measured by ASTM D1238, condition L is provided.

In certain embodiments, the resin comprises a melt flow index greater than 325 g/10 min. and less than 750 g/10 min. as measured by ASTM D1238, condition L. In other embodiments, the resin comprises a melt flow index greater than or equal to 750 g/10 min and less than 1000 g/10 min. as measured by ASTM D1238, condition L. In certain examples, the resin comprises a melt flow index greater than 1000 g/10 min. and less than 1250 g/10 min. as measured by ASTM D1238, condition L. In certain embodiments, the resin comprises a melt flow index greater than or equal to 1250 g/10 min. as measured by ASTM D1238, condition L.

In some embodiments, the composite material comprises at least one surface layer disposed on the polymer core. In other embodiments, the surface layer comprises a high melt flow index resin. In additional embodiments, the surface layer comprises one or more of a fabric, a film, a scrim, and combinations thereof. In further embodiments, the basis weight/flexural slope ratio of the core is less than 20 gsm-cm/N. In other embodiments, the basis weight/machine direction peak load ratio of the core is less than 66 gsm/N.

In an additional aspect, a method of facilitating formation of a vehicle part, the method comprising providing a thermoplastic composite article comprising a fiber reinforced polymer core comprising a high melt flow index resin and a surface layer disposed on the fiber reinforced polymer core is provided.

In certain embodiments, the resin comprises a melt flow index greater than 325 g/10 min. and less than 750 g/10 min. as measured by ASTM D1238, condition L. In some embodiments, the resin comprises a melt flow index greater than or equal to 750 g/10 min and less than 1000 g/10 min. as measured by ASTM D1238, condition L. In certain embodiments, the resin comprises a melt flow index greater than 1000 g/10 min. and less than 1250 g/10 min. as measured by ASTM D1238, condition L. In other embodiments, the resin comprises a melt flow index greater than or equal to 1250 g/10 min. as measured by ASTM D1238, condition L.

Additional features, aspect, examples and embodiments are described in more detail below.

BRIEF DESCRIPTION OF THE FIGURES

Certain embodiments are described with reference to the accompanying figures in which.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar material, if desired.

DETAILED DESCRIPTION

Certain embodiments are described below with reference to singular and plural terms in order to provide a user friendly description of the technology disclosed herein. These terms are used for convenience purposes only and are not intended to limit the articles, composites and other subject matter as including or excluding certain features unless otherwise noted as being present in a particular embodiment described herein.

In certain examples described herein, articles can be produced using one or more high melt flow index resins. The term "high melt flow resin" is a relative term and generally refers to the ease of flow of the melt of a thermoplastic polymer. In some embodiments, the term "high" refers to resins whose melt flow indices, as measured by ASTM D1238, condition L, are about 100 g/10 min. or more. In other embodiments, the term "high" refers to resins whose melt flow indices, as measured by ASTM D1238, condition L, are 325 g/10 min or higher or are greater than 325 g/10 min., e.g., 350 g/10 min., 400 g/10 min., 450 g/10 min., 500 g/10 min., 550 g/10 min, 600 g/10 min. or more. In some embodiments, a resin whose melt flow index is greater than 325 g/10 min. but less than 750 g/10 min. is referred to herein as a "fast melt flow resin." In certain examples, a resin whose melt flow index is greater than or equal to 750 g/10 min but less than 1000 g/10 min is referred to as a "super melt flow resin." In other embodiments, a resin whose melt flow index is greater than or equal to 1000 g/10 min but less than 1250 g/10 min. is referred to as a "hyper melt flow resin." In yet additional embodiments, a resin whose melt flow index is greater than or equal to 1250 g/10 min is referred to as an "extreme melt flow resin." The particular resin selected for use in the articles described herein may depend, for example, on the overall desired weight of the article, its desired physical properties, production costs, production time and desired end use of the article. In certain embodiments, articles described herein that include a high melt flow resin can weigh less while retaining desired physical properties. Where high melt flow resins are used in vehicular parts, increased gas mileage can be achieved due to reduction in overall weight while still retaining the desired structural and physical features of the vehicular parts.

In certain embodiments, where the test ASTM D1238 is referred to herein, the temperature used is 230° C. and the load is 2.16 kg as specified in "condition L" of the ASTM D1238 test method. Unless otherwise clear from the context where a different condition is specified, reference to ASTM D1238 refers to condition L conditions.

In certain examples, the exact processing conditions used to provide an article including a high melt flow index resin can vary. In some embodiments, the processing temperature can be lower, compared to the processing temperature used with resins other than high melt flow index resins. The use of lower temperatures saves energy and can reduce production time as the articles may be heated at lower temperatures or the overall heating time may be less. In some embodiments, high melt flow index resins may also include lower amounts of thermal stabilizers than present in resins other than high melt flow index resins. It may be desirable to reduce the processing temperature to avoid degradation of the high melt flow index resin. In some embodiments, one or more thermal stabilizers can be added to a high melt flow index resin to reduce the likelihood that it may degrade when exposed to high temperatures. While such thermal stabilizers may be added in an effective amount to deter degradation of the resin, the amount added desirably does not alter the basis weight of the final article to such an unwanted degree or alter the physical properties imparted to the article by the high melt flow index resin.

In certain embodiments, the high melt flow resin can be mixed with one or more additive or materials to impart a desired characteristic to the mixture. For example, the high melt flow resin can be mixed with particles, powders, whiskers, fillers, binders, fibers or other materials that can impart desired physical properties to an article that includes the high melt flow resin. In certain embodiments, flame retardant materials such as halogenated materials, phosphorated materials, nitrogenated materials or other suitable flame retardants can be added to the high melt flow resin. In further embodiments, smoke suppressants, oxygen scavengers, ultraviolet light inhibitors, dyes, colorants, pigments or other materials can be added to the high melt flow resin, either before curing or post-curing.

In some embodiments, the additive may include reinforcing materials that can impart increased strength to the article. For example, a composite article that is produced using a high melt flow resin can include one or more suitable types of reinforcing materials to impart a desired strength and/or mechanical properties to the composite. In some embodiments, the reinforcing materials can be one or more types of fibers. Illustrative types of fibers include, but are not limited to, glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, the fibers can be chemically treated prior to use to provide desired functional groups or to impart other physical properties to the fibers. The fiber content in the polymer core may be from about 20% to about 90%, more particularly from about 30% to about 70%, by weight of the polymer core. Typically, the fiber content of the composite varies between about 20% to about 90% by weight, more particularly between about 40% to about 80% by weight of the composite. The particular size and/or orientation of the fibers used may depend, at least in part, on the polymer material used and/or the desired properties of the resulting composite. Suitable additional types of fibers, fiber sizes and amounts will be readily selected by the person of ordinary skill in the art, given the benefit of this disclosure. In one non-limiting illustration, fibers dispersed within a high melt flow index resin, forming the polymer core material of the composite, for example, generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In some embodiments, the presence of a high melt flow index resin optionally in combination with one or more reinforcing materials can permit use of articles having a lower basis weight while retaining the properties of an article with a higher basis weight. For example, an article can be produced using a resin comprising a melt flow index resin of greater than 325 grams/10 minute that has a basis weight of 450 grams per square meter (gsm) or less. In some embodiments such an article may have the physical properties similar to an article that has a basis weight of 500 gsm. For example, by using a high melt flow index resin, the basis weight of the article can be reduced by at least 10%, more particularly at least 15%, for example, at least 20% or at least 25%, while retaining substantially similar physical properties as an article having a higher basis weight.

In certain embodiments, the high melt flow index resin can be used in a core layer comprising the high melt flow index and optionally one or more polymeric materials. In some embodiments, the high melt flow index resin may be or may comprise a thermoplastic material such as, for example, the illustrative thermoplastic materials described herein. If desired, the core can comprise reinforcing materials such as, for example, fibers, whiskers, powders, particles, cross-linkable materials, or other materials that can increase the overall strength or impart a desired mechanical property to the core material. Where reinforcing materials are present, they can be present in a continuous or discontinuous form, homogenously throughout the core or localized or otherwise present in larger amounts in some areas compared to other areas. In embodiments where the reinforcing materials are fibers, the fibers can be arranged parallel to each other, orthogonal to each other or present in no particular angular orientation depending on the desired properties of the core material.

In certain embodiments, the high melt flow index resins can be used to provide a composite article. Such composites can provide a number of attributes, e.g., they can be molded and formed into a variety of suitable structural and non-structural articles, including, but not limited to, an automotive structural component such as, for example, a bumper, an interior headliner, an underbody shield, a fender liner, a fender flare, a skid plate, a cross-member, a dashboard, and interior and exterior trim parts. In other examples, the composites can be used as, or can be part of, a building panel, an acoustic panel, a vehicle panel, a lightweight structural member such as those present in a recreational vehicle, a wind turbine blade, a wind turbine housing, a photovoltaic cell panel backing, or other applications where it may be desirable to use or include lightweight materials that can provide enhanced formability.

In certain embodiments, traditional glass fiber composites used in exterior structural applications can be generally compression flow molded and can be substantially void free in their final part shape. By comparison, low density glass fiber composites used in automotive interior applications can be generally semi-structural in nature and are porous and lightweight with densities ranging from 0.1 to 1.8 g/cm$^3$ and containing 5% to 95% voids distributed uniformly through the thickness of the finished part. Certain automotive specifications desire light weight, good flexural, impact, and other mechanical properties, as well as good thermoformability characteristics and/or improved mechanical properties.

In certain examples described herein, a composite article comprises a core comprising one or more high melt flow index resins. In some embodiments, the high melt flow index resin may comprise a thermoplastic material such as, for example, the illustrative thermoplastic materials described herein. If desired, the core of the composite can include reinforcing materials such as, for example, fibers, whiskers, powders, particles, cross-linkable materials, or other materials that can increase the overall strength or impart a desired mechanical property to the core material. Where reinforcing materials are present, they can be present in a continuous or discontinuous form, homogeneously throughout the core or localized or otherwise present in larger amounts in some areas compared to other areas. In embodiments where the reinforcing materials are fibers, the fibers can be arranged parallel to each other, orthogonal to each other or present in no particular angular orientation depending on the desired properties of the core material.

In certain embodiments, an outer surface layer or skin can be disposed or otherwise present on one or both sides of the core material or select areas or portions thereof. The term "skin" is used broadly and intended to include layers, fabrics, films and other materials that can be formed on the core material or can be pre-formed and subsequently disposed on the core material or select areas or portions thereof. In certain examples, the skin used is effective to permit processing of the article into a desired final shape or part.

In certain examples, the composite can provide improved mechanical properties including improved flexural modulus at a lower basis weight, higher peak load and slope, higher flexural slope or other suitable mechanical properties which are improved in the composite. While not required, more than a single mechanical property can be improved by using one or more high melt flow index resins in the composites described herein, e.g., an increase in peak load flexural modulus, and/or mechanical characteristics of the composite noted herein may be improved individually or in any combination with each other.

In certain embodiments, the composite can be porous, non-porous or includes areas which are porous while comprising other areas which are non-porous. The exact porosity present in the composite can vary depending on the intended use of the composite. In certain embodiments, the polymer core can comprise a porosity greater than 0% by volume of the polymer core, more particularly between greater than 0% to about 95% by volume of the polymer core, and still more particularly between about 30% to about 70% by volume of the polymer core. While not required, it is also possible that the overall composite, which includes the polymer core, is non-porous or has a porosity within the aforementioned ranges, e.g., the porosity of the composite may generally be greater than 0% to about 95% of the total volume of the composite, more particularly between greater than 0% to about 95% by the total volume of the composite, and still more particularly between about 30% to about 70% by the total volume of the composite. In yet other examples, the core or the overall composite may comprise a porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. If desired the porosity of the core or the overall composite may be greater than 95%, e.g., may be about 96% or 97%.

In certain examples, the composite typically includes a high melt flow index resin that is a polymer material that can function as an adhesive, binder, resin or is otherwise effective to impart desired properties to the composite. In some embodiments, the high melt flow index resin can be, or can include, a polymer resin or a polymer rosin. Illustrative types of polymer resins that can comprises a high melt flow index include, but are not limited to, those based on a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyimide resin, a polyphenylene ether resin, a polyphenylene oxide resin, a polyphenylene-sulphide resin, a polyether resin, a polyetherketone resin, a polyacetal resin, a polyurethane resin, a polybenzimidazole resin, and copolymers, mixtures and combinations thereof. In some embodiments, the high melt flow index resin can include two polymer resins, three polymer resins, four polymer resins or more. In other examples, different portions of the composite can include different polymer material compositions. For example, a first area of the composite can include a first high melt flow index resin, and a second area of the composite can include a second high melt flow index resin different from the first high melt flow index resin. Other high melt flow index resins may also be used that can be sufficiently softened by heat or other radiation to permit fusing and/or molding without being chemically or thermally decomposed (to any substantial degree) during processing or formation of the composite material. Such other suitable high melt flow index resins will be readily selected by the person of ordinary skill in the art, given the benefit of this disclosure.

In some embodiments, the high melt flow index resin can be pre-processed or chemically treated prior to use in the composites described herein. For example, thermostabilizers, softening agents, viscosity modifiers, thickening agents, chaotropic agents, diluents or other materials can be added to the high melt flow index resins prior to their use to provide a composite article. In certain examples, a dispersing agent can be added to the high melt flow index resin to assist in mixing of the high melt flow index resin with other components used to provide the article.

In certain embodiments, the composite described herein can comprise a glass mat thermoplastic composite (GMT). One such mat is prepared by HANWHA AZDEL, Inc. and sold under the trademark SUPERLITE® mat. Preferably, the areal density of such a GMT is from about 400 grams per square meter of the GMT (g/m2) to about 4000 g/m2, although the areal density may be less than 400 g/m2 or greater than 4000 g/m2 depending on the specific application needs. In some embodiments, the upper density can be less than about 4000 g/m2. Where the core includes a high MFI resin and/or one or more skins with a high MFI resin, the basis weight of the GMT can be reduced to less than 400 gsm without sacrificing desired physical properties.

In certain examples, the glass mat thermoplastic composite can be generally prepared using chopped glass fibers, a high melt flow index resin and a thermoplastic polymer film or films and or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the high melt flow index resin. To produce the glass mat, the high melt flow index resin, reinforcing materials and/or other additives can be added or metered into a dispersing foam contained in an open top mixing tank fitted with an impeller. Without wishing to be bound by any particular theory, the presence of trapped pockets of air of the foam can assist in dispersing the glass fibers and high melt flow index resin. In some examples, the dispersed mixture of glass and high melt flow index resin can be pumped to a head-box located above a wire section of a paper machine via a distribution manifold. The foam, not the glass fiber or high melt flow index resin, can then be removed as the dispersed mixture is provided to a moving wire screen using a vacuum, continuously producing a uniform, fibrous wet web. The wet web can be passed through a dryer at a suitable temperature to reduce moisture content and to melt or soften the high melt flow index resin. When the hot web exits the dryer, a surface layer such as, for example, a thermoplastic film may be laminated onto the web by passing the web of glass fiber, thermoplastic resin and thermoplastic polymer film or films through the nip of a set of heated rollers. A non-woven and/or woven fabric layer may also be attached along with or in place of the thermoplastic film to one side or to both sides of the web to facilitate ease of handling the glass fiber-reinforced mat. The composite can then be passed through tension rolls and continuously cut (guillotined) into the desired size for later forming into an end product article. Further information concerning the preparation of such GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

Figure 1A:
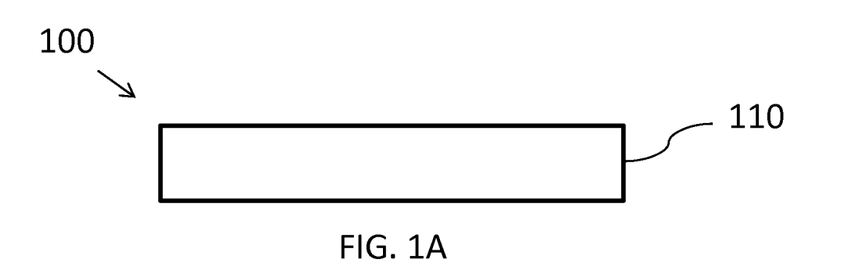
FIG. 1A is an illustration of a core layer comprising a high melt flow index resin, in accordance with certain examples.

Certain illustrative configurations of articles that include a high melt flow index resin are shown in the figures. Referring now to FIG. 1A, a composite 100 is shown that comprises a layer 110 comprising a high melt flow index resin. The layer 110 can include any one or more of those materials described herein, e.g., a GMT composite produced using glass fibers and a high melt flow index resin comprising polypropylene or polybutylene terephthalate or a combination thereof or other suitable high melt flow index resin. In some embodiments, the basis weight of the layer 110 may vary from about 150 gsm to about 3000 gsm, more particularly about 200 gsm to about 3000 gsm, e.g., about 500-1800 gsm. In certain examples, the layer 110 can have dimensions of about 1 meter wide by about 6 meters long, more particularly about 2 meters wide by about 5 meters long, e.g., about 2 meters wide cm by about 4 meters long cm. In some embodiments, the overall thickness of the composite can vary from about 0.5 mm to about 30 mm, more particularly about 3 mm to about 25 mm cm, e.g., about 0.5 mm to about 10 mm The overall dimensions and size of the layer 110 can be shaped or trimmed to a desired size prior to stacking or palletizing the sheets of the layer 110 for shipping purposes.

Figure 1B:
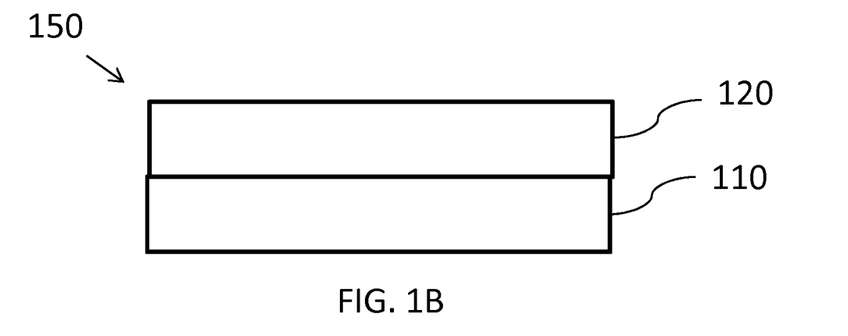
FIG. 1B is an illustration of two core layers coupled to each other with at least one of the core layers comprising a high melt flow index resin, in accordance with certain examples.

In some examples, the layer 110 may be joined or coupled to another layer similar to the layer 110 to provide a two-layer stack as shown in FIG. 1B. For example, the article 150 can include a layer 120 disposed on the layer 110. In some embodiments, the layer 120 may include a resin with a melt flow index that is less than 100 g/10 minutes. In other embodiments, each of the layers 110, 120 may include the same high melt flow index resin, whereas in additional examples, the layer 120 may include at least one high melt flow index resin that is different from a high melt flow index resin(s) used in the layer 110. If desired, one or more adhesives or other materials can be placed between the layers 110, 120 to couple them to each other. In some embodiments, no adhesive or other material is present between the layers, and heating of the layers 110, 120 to soften them can be used to couple the two layers 110, 120 to each other. If desired, the article 150 can be consolidated, passed through rollers, compressed, molded or otherwise subjected to one or more post-coupling steps to provide a desired thickness, shape, porosity, or other physical property. While the two layers 110, 120 are shown in FIG. 1B as having substantially the same thickness, the thickness of the two layers 110, 120 can vary. For example, it may be desirable to configure one of the layers 110, 120 with increased thickness where that layer is designed to impart structural stiffness to the article. In some configurations, the fibers or other additives used in each of the layers 110, 120 may be the same or may be different. For example, it may be desirable to use a first type of fiber in layer 110 and a second, different type of fiber in the layer 120 to impart desired overall properties to the final article. In some examples, the same type of fibers can be used in the layers 110, 120, but the fiber loading weights can be varied if desired to provide a fiber gradient from surface to surface within the article 150. In certain examples, one or more additional layers comprising a high melt flow index resin (or comprising a resin with a melt flow index less than 100 g/10 minutes) can be coupled to the article 150 to provide a three-layer stack, a four-layer stack or a multi-layer stack, if desired.

Figure 2:
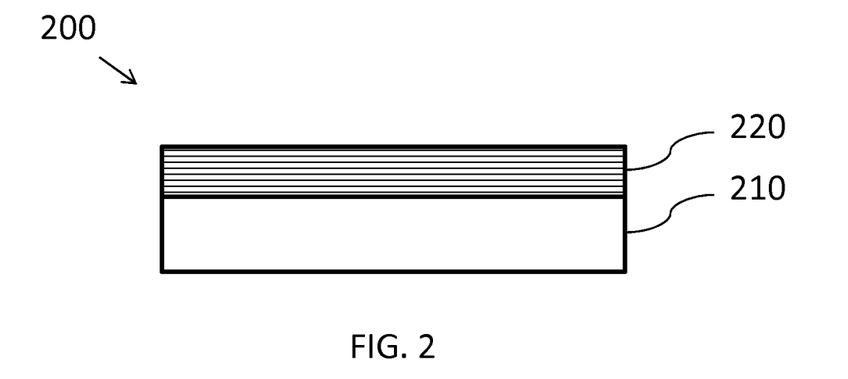
FIG. 2 is an illustration of a composite article comprising a core layer than includes a high melt flow index resin and a surface layer disposed on the core layer, in accordance with certain examples.

In certain embodiments, a composite article comprising a core layer comprising a high melt flow index resin and a surface layer disposed thereon is described. In some embodiments, the core layer can be a single layer as shown in FIG. 1A or may be a two or more layer stack as shown and described in reference to FIG. 1B. Referring now to FIG. 2, a composite article 200 comprising a core layer 210 with a surface layer or skin 220 disposed thereon is shown. In some examples, the core layer 210 comprises one or more high melt flow index resins as described herein optionally in combination with one or more types of fiber reinforcing materials. While the surface layer 220 is shown as being disposed on an upper planar surface of the core layer 210, the surface layer 220 can be disposed on a surface orthogonal to a longitudinal plane of the core layer 210, e.g., on one or more sides of the core layer 210 or on both planar surfaces and side surfaces of the core layer 210. In some configurations, the surface layer 220 can be generally continuous from one side of the core layer 210 to the other side of the core layer 210. In certain instances, the surface layer 220 can be disposed in strips or patches on the core layer 210 such that certain portions of the core layer 210 are exposed to ambient. In other embodiments, the surface layer 220 may have a varying thickness across the planar surface of the core layer 210. For example, certain regions of the surface layer 220 may be thicker than other regions of the surface layer 220 to provide desired strength or properties to certain regions. In some embodiments, the surface layer 220 may comprise fibers, e.g., unidirectional or bidirectional fibers may be present in the layer 220. Where bidirectional fibers are present in the layer 220, the fibers may be oriented ninety degrees from each other, forty-five degrees from each other or oriented at other angles relative to each other. In some instances, a first fiber plane may be present in the layer 220 and a second fiber plane may be present in the layer 220. Each of the fiber planes may comprises fibers which are substantially parallel to each other and lie in the same plane. The fibers of the two different fiber planes can be arranged orthogonal to each other, e.g., can be present in a 0/90 orientation if desired.

In certain embodiments, the surface layer 220 may include its own resin that has a melt flow index that is less than 100 g/10 minutes. In other embodiments, the surface layer 220 can include a high melt flow index resin comprising a melt flow index of at least 100 g/10 minutes, e.g., a resin comprising a melt flow index of at least 325 g/10 minutes, more particularly at least 500 g/10 minutes. Where both the core layer 210 and the surface layer 220 include a high melt flow index resin, the melt flow indices can be matched such that the melt flow index in each of the core layer 210 and the surface layer 220 are substantially the same. In other embodiments, the melt flow indices of the core layer 210 and the surface layer 220 are positively offset such that the melt flow index of the resin of the core layer 210 is greater than the melt flow index of the resin of the surface layer 220. In certain embodiments, the melt flow indices of the core layer 210 and the surface layer 220 are negatively offset such that the melt flow index of the resin of the core layer 210 is less than the melt flow index of the resin of the surface layer 220. In certain embodiments, the resin in the surface layer 220 may include a mixture of resins at least one of which can have a melt flow index substantially the same as a resin present in the core layer 210. Mixing of the two resins in the surface layer can alter the overall melt flow index to be different from the melt flow index of the resin or resin mixture in the core layer 210. The exact composition of the resin used in the core layer 210 and the surface layer 220 may be the same or may be different even when the melt flow indices of the resin the core layer 210 and the surface layer 220 are substantially the same.

In certain embodiments, the surface layer 220 can be disposed on the core layer 210 subsequent to formation of the core layer 210, and may be laminated, bonded or otherwise attached to the core layer 210 in some manner. In certain embodiments, the surface layer 220 can be selected to comprise a basis weight of at least 10 gsm, more particularly at least 20 gsm, 40 gsm, 60 gsm, 90 gsm, 100 gsm, 120 gsm, 140 gsm, 150 gsm, 200 gsm, 225 gsm, 250 gsm, 300 gsm, 400 gsm, 500 gsm or more. In certain embodiments, the surface layer 220 may be, or may include a film, fabric, e.g., woven or non-woven fabrics, a scrim, a veil or combinations thereof. In other configurations, the surface layer 220 may comprise two or more different materials. For example, the surface layer 220 can include a woven material and a non-woven material.

In certain embodiments, the article 200 shown in FIG. 2 can include additional layers disposed on the layer 210 to provide a surface-layer stack. In some embodiments, each layer of the surface layer stack may be the same, whereas in other embodiments, the layers of the surface layer stack can all be different or at least two of the layers in the surface layer stack can be different. In some embodiments where a surface layer stack is present, at least one layer of the surface layer stack comprises a resin that has a melt flow index of at least 100 g/10 minutes, more particularly at least 325 g/10 minutes, for example, at least 500 g/10 minutes. In other embodiments, at least two of the layers of the surface layer stack comprise a resin that has a melt flow index of at least 100 g/10 minutes, more particularly at least 325 g/10 minutes, for example, at least 500 g/10 minutes. In certain examples, all of the layers of the surface layer stack comprise a resin that has a melt flow index of at least 100 g/10 minutes, more particularly at least 325 g/10 minutes, for example, at least 500 g/10 minutes. Where the layers of the surface layer stack have a similar melt flow index, the composition of the resin may be the same or may be different. In some embodiments, at least one of the layers of the surface layer stack can include a resin or reinforcing materials that are present in the core layer. In other embodiments, similar reinforcing materials, e.g., glass fibers, can be present in the core layer and each layer of the surface layer stack. In some embodiments, at least one layer of the surface layer stack includes a different reinforcing material than the reinforcing material present in the core layer.

Figure 3:
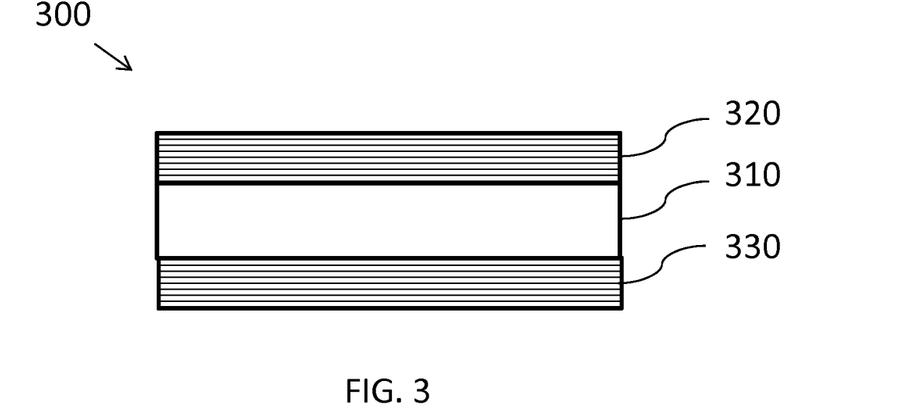
FIG. 3 is an illustration of a composite article comprising a core layer that includes a high melt flow index resin and a surface layer disposed on each side of the core layer, in accordance with certain examples.

In certain examples, an article comprising two surface layers is provided. Referring to FIG. 3, an article 300 comprises a core layer 310, a first surface layer 320 disposed on one surface of the core layer 310, and a second surface layer 330 disposed on an opposite surface of the core layer 310. In certain embodiments, the first and second surface layers 320, 330 can be the same, whereas in other embodiments, the first and second surface layers can be different. In certain examples, the core layer 310 can include a high melt flow index resin, e.g., one with a melt flow index or 325 g/10 min. or more, and each of the surface layers 320, 330 can include a resin other than a high melt flow index resin, e.g., a resin with a melt flow index that is less than 100 g/10 min. In some embodiments, at least one of the surface layers 320, 330 can include a high melt flow index resin, whereas in other embodiments, both of the surface layers 320, 330 can include a high melt flow index resin. Where a high melt flow index resin is present in one or both of surface layers 320, 330, the core layer 310 may or may not include a high melt flow index resin, e.g., the core can include a resin with a melt flow index that is less than 100 g/10 min. In some embodiments, at least one layer, e.g., the core layer 310 or one or both surface layers 320, 330, can include a resin comprising a melt flow index greater than or equal to 100 g/10 minutes, e.g., greater than or equal to 325 g/10 min., greater than 325 g/10 min, or even greater than 500 g/10 min. In some examples, the core layer 310 and the surface layer 320 can include a high melt flow index resin, and the surface layer 330 can include a resin with a melt flow index less than 100 g/10 min.

In certain examples, the core layer 310 can include one or more reinforcing materials to provide desired physical properties to the article 300. In some embodiments, the reinforcing materials can take the form of fibers, whiskers, powders or other materials. In some embodiments, at least one of the layers 320, 330 can include a reinforcing material that is present in the core layer. In other embodiments, similar reinforcing materials, e.g., glass fibers, can be present in the core layer and one or both of surface layers 320, 330. In some embodiments, at least one of the layers 320, 330 includes a different reinforcing material than the reinforcing material present in the core layer 310. In some embodiments, reinforcing materials can be present in each of the layers 320, 330, but they may not necessarily be the same reinforcing materials or present in the same amount. In some examples, one of the surface layers 320, 330 can include a surface layer stack as described in reference to FIG. 2, whereas in other embodiments, both of the surface layers 320, 330 can include a surface layer stack as described in reference to FIG. 2. In certain embodiments, each of the surface layers 320, 330 may be, or may include a film, fabric, e.g., woven or non-woven fabrics, a scrim, a veil or combinations thereof. In some configurations, the surface layers 320, 330 include the same materials, whereas in other configurations one or more different materials are present in surface layer 320 than those present in surface layer 330. If desired, each or both of the surface layers 320, 330 may comprise two or more different materials. For example, the surface layer 320 can include a woven material and a non-woven material, and the surface layer 330 can include two different types of woven materials.

In certain embodiments, each of the surface layers 320, 330 can be disposed on the core 310 subsequent to formation of the core 310, and may be laminated, bonded or otherwise attached to the core 310 in some manner. Without wishing to be bound by any particular scientific theory, during processing, the surface layers can bond to the polymer core by fusion with the polymer component of the core, optionally through the use of an adhesive(s), to provide sufficient bond strength between the core and the surface layers 320, 330 in order to prevent delamination during thermoforming. In some examples, the adhesive may be in the form of a layer, such as a film, coating, or other type of layer applied to the core and/or the surface layers, whereas in other examples, adhesive may be disposed intermittently between the surface layers 320, 330 and the core layer 310. If desired, scattered particles between the core and the surface layers can be present, and, the particles may, but are not required to, provide adhesion (or additional adhesion) between the core and the surface layer. The surface layers 320, 330 may be added at the same time to the core layer 310, or, if desired, the first surface layer 320 can be bonded or laminated to the core layer 310 and subsequently the second surface layer 330 can be bonded or laminated to the core layer 310. In some embodiments, the first surface layer 320 is added to the core layer 310 but bonding or laminating processes are not performed until the second layer 330 is added to the core layer 310. It may be desirable to tack or weld, e.g., using ultrasonic welding, areas of the first surface layer 320 to the core layer 310 prior to processing to prevent the first surface layer 320 from becoming disengaged from the core layer 310 as the second surface layer 330 is being added to the core layer 310.

In certain embodiments, at least one of the surface layers 320 and 330 can be selected to comprise a basis weight of at least 10 gsm. In certain examples, each of the surface layers 320, 330 can be selected to comprise a basis weight of at least 10 gsm. The basis weight of each of the surface layers may be the same or may be different. Where two surface layers are present in an article, the basis weight of the core layer may be about 300 gsm to about 3000 gsm. In certain embodiments, each of the surface layers 320, 330 may independently include areas that are variable in composition, e.g., have different fibers, different resin content or different basis weights.

In some embodiments, an additional core layer can be added to the article shown in FIG. 3, e.g., on top of the surface layer 320, such that two core layers are present and separated by surface layer 220. An additional surface layer can then be added to the additional core layer to provide a stack of layers. If desired, additional core and surface layers may be stacked to provide a multi-layer article comprising a plurality of core layers and surface layers.

In certain embodiments, the composite articles shown in FIGS. 1-3 can be produced using numerous methods. For example, the composite may generally be prepared in various forms, such as sheets or films, as layered materials on preformed substrates, or in other more rigid forms depending on the particular application desired. For certain applications, the composite can be provided in sheet form and may optionally include, in addition to the surface layers, one or more additional layers on one or both surfaces of such sheet. In one illustration, such additional surface or skin layers may be, for example, a film, non-woven scrim, a veil, a woven fabric, or combinations thereof. If desired, the surface layers may be air permeable and can substantially stretch and spread with the composite article during thermoforming and/or molding operations. In addition, such layers may be adhesive, such as a thermoplastic material (e.g., an ethylene acrylic acid copolymer or other such polymers) applied to the surface of the fiber-containing thermoplastic material. Generally, the areal density of the composite article, particularly when in sheet form, varies from about 150 gsm to about 4000 gsm, more particularly about 500 gsm to about 3000 gsm, e.g., about 300 gsm to about 500 gsm, or about 500 gsm to about 750 gsm or about 750 gsm to about 2500 gsm.

In certain embodiments, the composite materials described herein can be used to provide intermediate and final form articles, including construction articles or articles for use in automotive and other applications including, but not limited to, underbody panels, a parcel shelf, package tray, headliner, door module, instrument panel topper, body and hood panels, side wall panels such as for recreational vehicles, cargo liners, front and/or rear pillar trim, a sunshade, and the like. Other such articles will be apparent to the skilled artisan. The composite material can be molded into various articles using numerous methods including, but not limited to, pressure forming, thermal forming, thermal stamping, vacuum forming, compression forming, and autoclaving. Illustrative methods are described, for example, in U.S. Pat. Nos. 6,923,494 and 5,601,679, and in DuBois and Pribble's "Plastics Mold Engineering Handbook", Fifth Edition, 1995, pages 468 to 498 and elsewhere.

Figure 4:
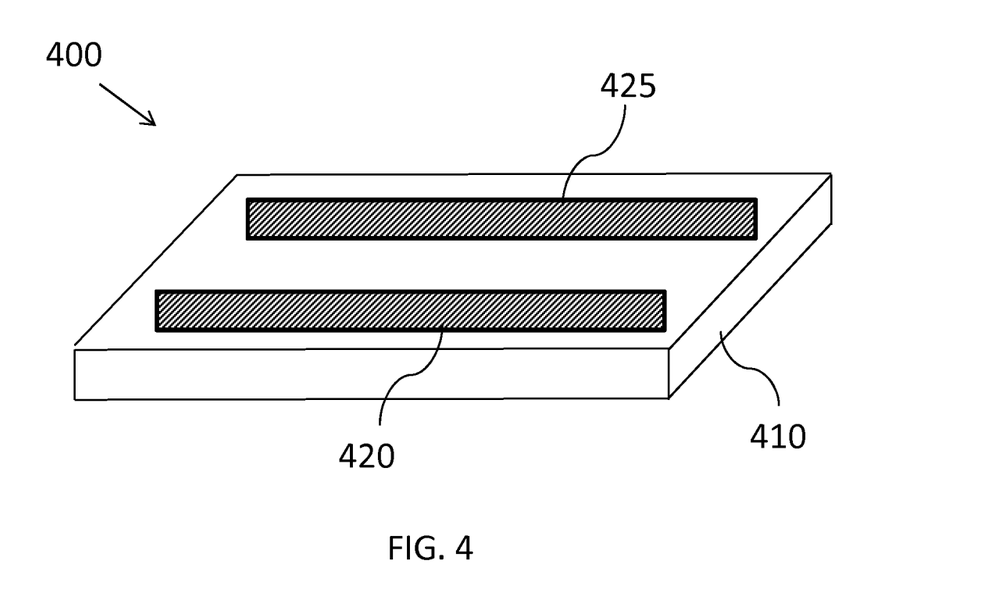
FIGS. 4-7 are illustrations of articles including a core layer comprising a high melt flow index resin and strips of a surface layer disposed on the core layer, in accordance with certain examples.

In certain examples, the surface layers described herein can be disposed on an entire surface of the core layer, can be disposed intermittently on the surface or can be disposed in patches. Illustrations showing perspective views of a composite with skin materials disposed in different manners are shown in FIGS. 4-7. Referring to FIG. 4, a composite 400 comprises a core layer 410 and strips of a surface layer material 420 and 425 disposed generally along the long-axis direction of the composite article 400. While not wishing to be bound by any particular scientific theory, it may be desirable to dispose the surface layer in areas where additional reinforcement is needed. In some embodiments, one or more patches can be disposed on an existing surface layer to provide additional reinforcement to those areas. The exact dimensions, width and composition of the strips 420 and 425 can vary and typically the strips can be produced from the same materials and using the same processes as those used to produce the surface layers described herein. In some embodiments, at least one of the strips 420 and 425 can be selected to include a high melt flow index resin. In certain examples, each of the strips 420 and 425 can be selected to comprise a high melt flow index resin. The composition and dimensions of the strips 420 and 425 need not be the same. In addition, areas of each of the strips 420 and 425 may include different compositions, e.g., different fibers, different porosities, different high melt flow index resins, etc. In other configurations, the entire planar surface of the core can include a first surface layer, and strips, such as those shown in FIG. 4, can be disposed on a surface opposite the first surface layer. While FIG. 4 shows a composite 400 comprising two strips 420 and 425, a plurality of strips can also be used, e.g., three, four, five, six or more separate strips can be present. In some embodiments, the strips can be applied by an end-user prior to forming of the composite article into a desired structure or shape, e.g., into an automotive part.

Figure 5:
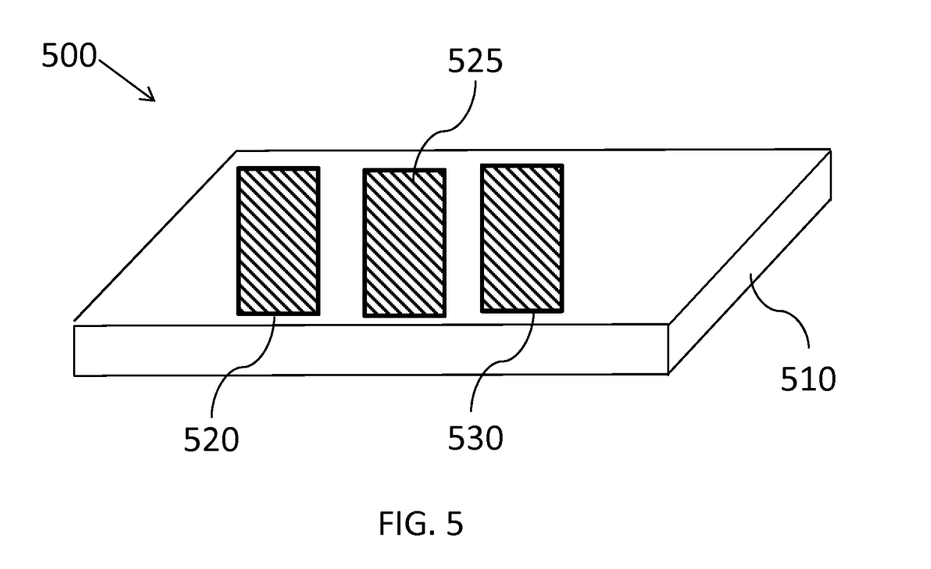

Referring now to FIG. 5, a composite article 500 is shown comprising a core layer 510 with a plurality of surface strips 520, 525 and 530 disposed on the core layer 510 in a direction generally orthogonal to the long axis direction of the composite article 500. As described herein, it may be desirable to dispose the surface strips in areas of the composite article where additional reinforcement is desirable, e.g., at the edges. The exact dimensions, width and composition of the strips 520, 525 and 530 can vary and typically the strips can be produced from the same materials and using the same processes as those used to produce the surface layers described herein. In some embodiments, at least one of the strips 520, 525 and 530 comprise a high melt flow index resin. In other embodiments, at least two of the strips 520, 525 and 530 comprise a high melt flow index resin. In certain examples, all of the strips 520, 525 and 530 comprise a high melt flow index resin. The strips 520, 525 and 530 can also include a reinforcing material which may be the same or may be different in the various strips 520, 525 and 530. In certain examples, at least one of the strips 520, 525 and 530 can be selected to provide a basis weight of at least 10 gsm. In certain examples, at least two of the strips 520, 525 and 530 can be selected to comprise a basis weight of at least 10 gsm. In other examples, each of the strips 520, 525 and 530 can be selected to comprise a basis weight of at least 10 gsm. If desired, areas of each of the strips 520, 525 and 530 may include different compositions, e.g., different fibers, different porosities, different high melt flow index resins. In other configurations, the entire planar surface of the core layer 510 can include a first surface layer, and strips, such as those shown in FIG. 5, can be disposed on the first surface layer. While FIG. 5 shows a composite 500 comprising three strips 520, 525 and 530, more than three strips can be used, e.g., four, five, six or more separate strips can be present. In some embodiments, the strips can be applied by an end-user prior to forming of the composite into a desired structure or shape, e.g., into an automotive part.

Figure 6:
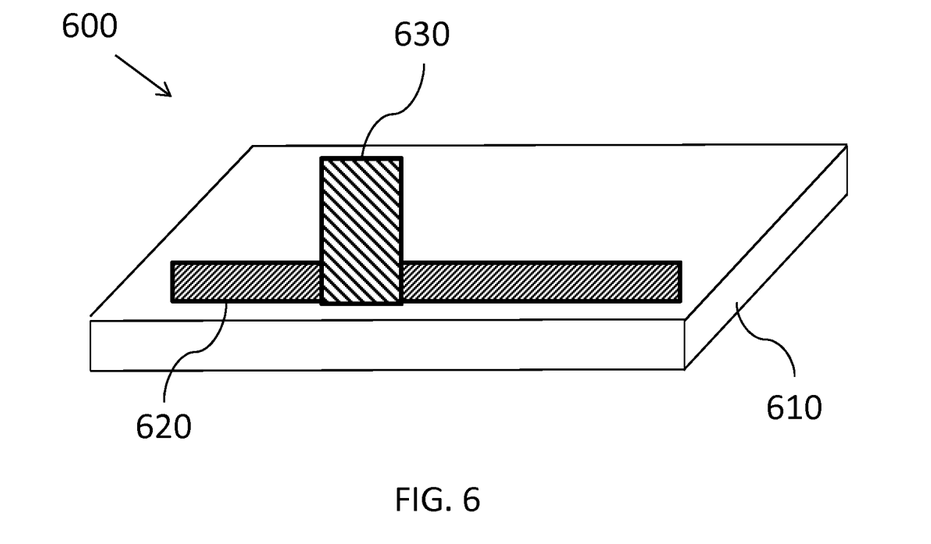

In certain embodiments where strips are disposed on a core material, more than a single strip can be provided, and the different strips can be positioned different on the composite. Referring to FIG. 6, a composite article 600 comprises a core 610, a first strip 620 disposed on the core 610, and a second strip 630 disposed on the first strip 620. The second strip 630 is disposed orthogonal to the first strip 620. In certain instances, the angle between the strips 620 and 630 need not be ninety degrees, e.g., it can be less than ninety degrees. The embodiment shown in FIG. 6 comprises the first strip 620 disposed immediately adjacent to the core 610, but in other examples, the strip 630 can be disposed immediately adjacent to the core 610 and the strip 620 can be disposed on the strip 630. As described herein, it may be desirable to dispose the strips in areas of the composite to provide additional reinforcement. The exact dimensions, width and composition of the strips 620 and 630 can vary and typically the strips can be produced from the same materials and using the same processes as those used to produce the surface layers described herein. In some embodiments, at least one of the strips 620 and 630 can be selected to comprise a high melt flow index resin as described herein. In other embodiments, both of the strips 620 and 630 can be selected to comprise a high melt flow index resin as described herein. In some examples, at least one of the strips comprises a basis weight of at least 10 gsm. In certain examples, each of the strips 620 and 630 comprises a basis weight of at least 10 gsm. The composition and dimensions of the strips 620 and 630 need not be the same. In addition, areas of each of the strips 620 and 630 may include different compositions, e.g., different fibers, different porosities, different high melt flow index resins, etc. In other configurations, the entire planar surface of the core can include a first surface layer, and strips, such as those shown in FIG. 6, can be disposed on the first surface layer. While FIG. 6 shows a composite article 600 comprising two strips 620 and 630, a plurality of strips can also be used, e.g., three, four, five, six or more separate strips can be present. In some embodiments, the strips can be applied by an end-user prior to forming of the composite into a desired structure or shape, e.g., into an automotive part.

Figure 7:
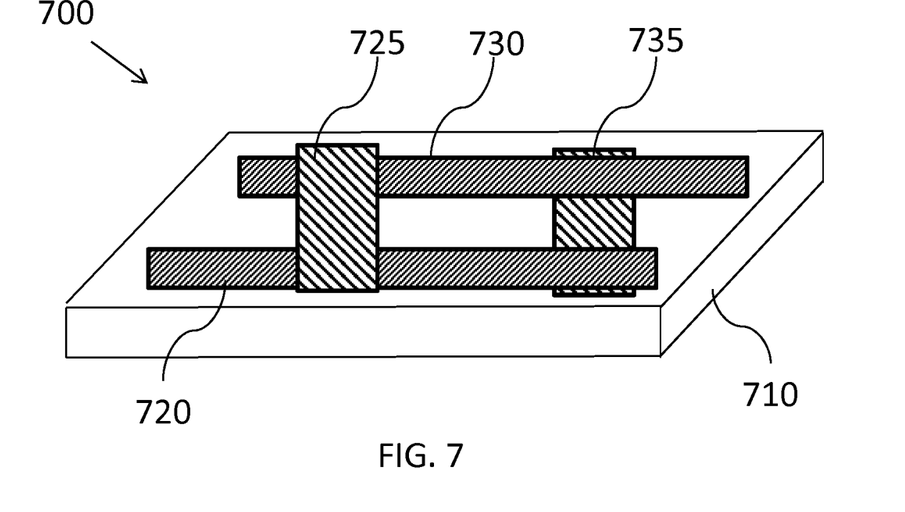

In certain examples where two or more strips are disposed on a core, different areas of the strips may be disposed in a different manner. Referring to FIG. 7, a composite article 700 comprises a core layer 710 with strips 720, 725, 730 and 735 disposed on the core layer 710. The strip 735 is positioned in direct contact with the core 710 and under the strips 720 and 730, whereas the strip 725 is positioned on top of the strips 720 and 730. In a different configuration, the strip 735 could be positioned under the strip 730 but on top of the strip 720.

As described herein, it may be desirable to dispose the skin material in areas of the composite to be subjected to deep draw processes, whereas non-subjected areas can be left skin free. The exact dimensions, width and composition of the strips 720, 725, 730 and 735 can vary and typically the strips can be produced from the same materials and using the same processes as those used to produce the skins described herein. In some embodiments, at least one of the strips 720, 725, 730 and 735 can include a high melt flow index resin. In other embodiments, at least two of the strips 720, 725, 730 and 735 can include a high melt flow index resin. In some examples, at least three of the strips 720, 725, 730 and 735 can include a high melt flow index resin. In certain embodiments, all of the strips 720, 725, 730 and 735 can include a high melt flow index resin. In certain embodiments, at least one of the strips 720, 725, 730 and 735 can have a basis weight of at least 10 gsm. In other embodiments, at least two of the strips 520, 525, 530 and 535 can have a basis weight of at least 10 gsm. In additional embodiments, at least three of the strips 720, 725, 730 and 735 can have a basis weight of at least 10 gsm. In certain examples, each of the strips 720, 725, 730 and 735 can have a basis weight of at least 10 gsm. The composition and dimensions of the strips 720, 725, 730 and 735 need not be the same. In addition, areas of each of the strips 720, 725, 730 and 735 may include different compositions, e.g., different fibers, different porosities, different high melt flow index resins, etc. In other configurations, the entire planar surface of the core can include a first surface layer, and strips, such as those shown in FIG. 7, can be disposed on the first surface layer. While FIG. 7 shows a composite 700 comprising four strips 720, 725, 730 and 735, more than four strips can also be used, e.g., five, six, seven, eight or more separate strips can be present. In some embodiments, the strips can be applied by an end-user prior to forming of the composite into a desired structure or shape, e.g., into an automotive part.

Figure 8:
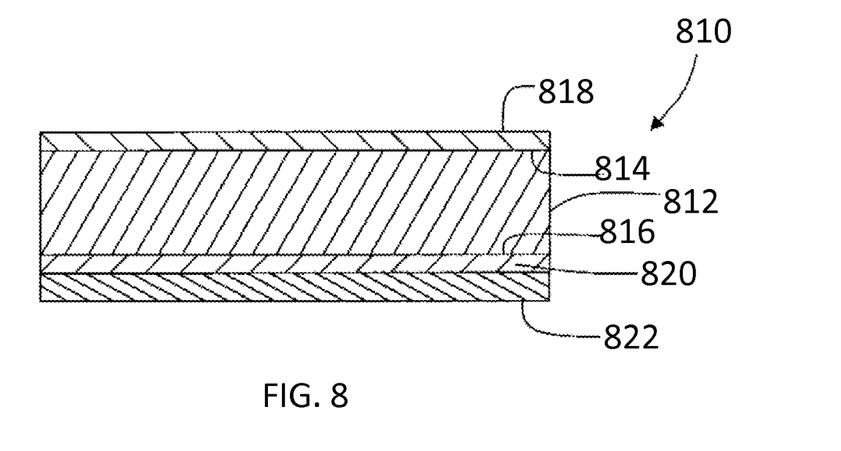
FIG. 8 is an illustration of a composite article comprising a thermoplastic core layer comprising a high melt flow index resin and two surface layers disposed on the thermoplastic core layer, in accordance with certain examples.
Figure 9:
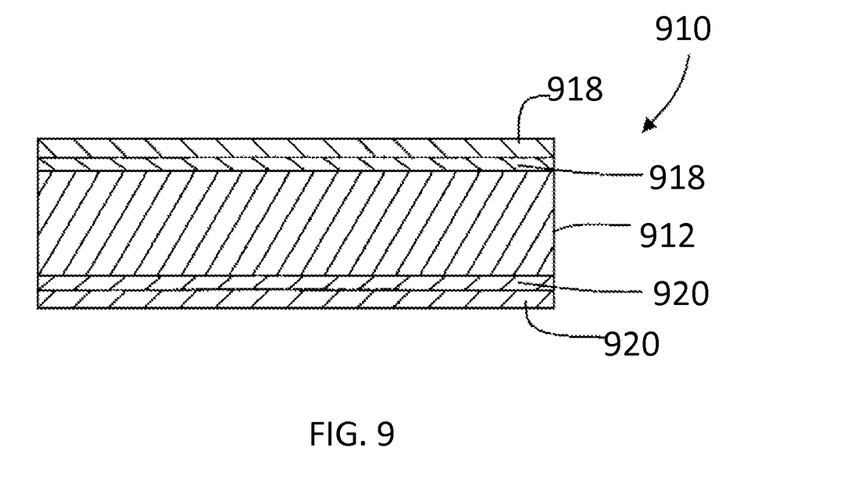
FIG. 9 is an illustration of a composite article comprising a thermoplastic core layer comprising a high melt flow index resin and multiple surface layers disposed on the thermoplastic core layer, in accordance with certain examples.

In certain embodiments, FIGS. 8 and 9 show embodiments of a lightweight thermoplastic composite. Referring to FIG. 8, the lightweight composite article 810 comprises a lightweight porous polymer core layer 812 including a first surface 814 and a second surface 816. A first surface layer 818 can be attached to first surface 814 of the core layer 812. A second surface layer 820 can be attached to the second surface 816 of the core 812. An optional decorative surface layer 822 may be bonded to second surface layer 820 if desired. In some embodiments, the thermoplastic composite article 810 may include a decorative skin 822 bonded to first and second surface layers 818 and 820, or no decorative surface layers. Also, as described herein, the composite may include more than one first surface layer 818 and more than one second surface layer 820, e.g., one or more surface stacks may be present.

In certain examples, the polymer core layer 812 (and/or the cores shown in FIGS. 1-7) can be formed from a web comprising open cell structures formed by random crossing over of fibers held together, at least in part, by one or more high melt flow index thermoplastic resins, where the void content of the core layer 812 ranges in general between 0% and about 95%, more particularly greater than about 5%, and still more particularly between about 30% and about 70% of the total volume of core layer 812. In another configuration, the porous core 812 can comprise open cell structures formed by random crossing over of reinforcing fibers held together, at least in part, by one or more thermoplastic resins, where about 40% to about 100% of the cell structure, for example, are open and allow the flow of air and gases through. In certain examples, the core layer 812 has a density of about 0.1 gm/cm3 to about 2.25 gm/cm3, more particularly about 0.1 gm/cm3 to about 1.8 gm/cm3, and still more particularly about 0.3 gm/cm3 to about 1.0 gm/cm3. The core layer 812 may be formed using known manufacturing process, for example, a wet laid process, an air or dry laid process, a dry blend process, a carding and needle process, and other processes that are employed for making non-woven products. Combinations of such manufacturing processes may also be used, and additional suitable manufacturing processes will be readily selected by the person of ordinary skill in the art, given the benefit of this disclosure.

In certain embodiments, the polymer core layer can include about 20% to about 80% by weight of fibers having an average length of between about 5 mm and about 200 mm, and about 20% to about 80% by weight of a wholly or substantially unconsolidated fibrous or particulate thermoplastic materials, where the weight percentages are based on the total weight of polymer core layer. In another embodiment, the polymer core layer of the composites herein includes about 30% to about 60% by weight of fibers. In some examples, fiber comprising an average length of between about 5 mm and about 25 mm are typically utilized in polymer core. Suitable fibers include, but are not limited to, metal fibers, metalized inorganic fibers, metalized synthetic fibers, glass fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, coir fibers, and combinations thereof. Additional suitable fibers will be readily selected by the person of ordinary skill in the art, given the benefit of this disclosure.

In certain embodiments, fibers including an average length of about 5 mm to about 200 mm can be added with thermoplastic powder particles, such as polypropylene powder that can provide a high melt flow index resin, to an agitated aqueous foam. In another embodiment, reinforcing fibers including an average length of about 5 mm to about 75 mm, or more particularly, about 5 mm to about 50 mm may be used. The components can be agitated for a sufficient time to form a dispersed mixture of the reinforcing fibers and thermoplastic powder in the aqueous foam. The dispersed mixture can then be laid down on any suitable support structure, for example, a wire mesh, and then the water can be evacuated through the support structure forming a web. The web can be dried and heated above the softening temperature of the thermoplastic powder. The web can be cooled and pressed to a predetermined thickness and cooled to produce a polymer core layer having a porosity of greater than 0%, more particularly between about 5% to about 95% by volume.

In some embodiments, the web can be heated above the softening temperature of the high melt flow index thermoplastic resins in the core layer to substantially soften the plastic materials and is passed through one or more consolidation devices, for example calendaring rolls, a laminating machine, a double belt laminator, an indexing press, a multiple daylight press, an autoclave, and other such devices used for lamination and consolidation of sheets and fabrics so that the plastic material can flow and wet out the fibers. The gap between the consolidating elements in the consolidation devices can be set to a dimension less than that of the unconsolidated web and greater than that of the web if it were to be fully consolidated, thus allowing the web to expand and remain substantially permeable after passing through the rollers. In one embodiment, the gap can be set to a dimension about 5% to about 10% greater than that of the web if it were to be fully consolidated. A fully consolidated web means a web that is fully compressed and substantially void free. A fully consolidated web would have less than about 5% void content and have negligible open cell structure.

In certain examples, particulate plastic materials may include short plastics fibers that can be included to enhance the cohesion of the web structure during manufacture. Bonding can be affected by utilizing the thermal characteristics of the high melt flow index plastic materials within the web structure. The web structure can be heated sufficiently to cause the thermoplastic component to fuse at its surfaces to adjacent particles and fibers. In one embodiment, the high melt flow index thermoplastic resin used to form the core layer can be, at least in part, in a particulate form. Suitable high melt flow index thermoplastics include any of those resins noted herein above, or other comparable high melt flow index resins that will be selected by the person of ordinary skill in the art, given the benefit of this disclosure. Generally, thermoplastic resins in particulate form need not be excessively fine.

In certain embodiments, the surface layers 818 and 820 may also comprise prepreg structures formed by impregnating a resin on and around aligned fibers. Various methods of forming prepregs may be utilized, including without limitation, solution processing, slurry processing, direct impregnation of a fiber tow with molten polymer, fiber co-mingling, sintering of thermoplastic powder into a fiber tow, and the like.

In certain examples, fibers described above as suitable for use in making a core layer are also suitable in the surface layers 818 and 820. The fibers in the core layer may be the same as or different from the fibers in the surface layers 818 and 820. The fibers in surface layer 818 may also be the same as or different from the fibers in the surface layer 820. Even if the composition of the fibers is the same in the skins, the length or size of the fibers in the various surface layers may be different. Similarly, the length or size of the fibers in the surface layers and the core may be different even if the fiber composition is generally the same. Also, the thermoplastic resins described above as suitable for use in core layer 812 may also be used in surface layers 818 and 820 (or the strips described herein). The high melt flow index thermoplastic resin in core 812 may be the same as or different from the thermoplastic resin in one or both of the surface layers 818 and 820. The thermoplastic resin in layer 818 may also be the same as or different from the thermoplastic resin in surface layer 820. Surface layers 818 and 820 may be attached to the core 812 during the manufacturing process of the core 812 or surface layers 818 and 820 can be attached prior to forming an article, for example, an automotive interior component or an automobile exterior panel. Without limitation, surface layers 818 and 820 can be attached to the core layer 812 by adhesively bonding the skin(s) to the polymer core layer 812. Other suitable techniques will be selected by the person of ordinary skill in the art, given the benefit of this disclosure.

In another embodiment, an article can be formed from a thermoplastic composite by heating the composite to a temperature sufficient to melt the high melt flow index thermoplastic resin. The heated thermoplastic composite can be then positioned in a mold, such as a matched aluminum mold, heated to about 160° F. and stamped into the desired shape using a low pressure press. Where certain high melt flow index thermoplastic resins are used, the mold temperature can be reduced to about 150-155° F. or less to provide a sufficient temperature to melt the thermoplastic resin and permit molding. In other instances, the heated thermoplastic composite can be then positioned in a mold, such as a matched aluminum mold, heated to about 160° C. and stamped into the desired shape using a low pressure press. Where certain high melt flow index thermoplastic resins are used, the mold temperature can be reduced to about 150-155° C. or less to provide a sufficient temperature to melt the thermoplastic resin and permit molding. The thermoplastic composite can be molded into various articles using any method known in the art including, e.g., thermal forming, thermal stamping, vacuum forming, compression forming, and autoclaving. In another embodiment, a decorative layer 822 can be applied to a second surface layer 820 by any known technique, for example, lamination, adhesive bonding, and the like. The decorative layer 822 may be formed, e.g., from a thermoplastic film of polyvinyl chloride, polyolefins, thermoplastic polyesters, thermoplastic elastomers, or the like. Decorative layer 822 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. Decorative layer 822 may also be made using spunbond, thermal bonded, spunlace, melt-blown, wet-laid, and/or dry-laid processes.

In certain embodiments, a composite article 910 (see FIG. 9) can include two layers of the same material disposed on the core layer 912. For example, two layers of a material 918 can be disposed on one planar surface of the core layer 912, and two layers of a different surface layer material 920 can be disposed on a second planar surface of the core layer 912. Alternatively, the surface layers can be disposed such that one layer 918 is disposed on a different layer 920. Other configurations where two or more surface layers are present will be readily selected by the person of ordinary skill in the art, given the benefit of this disclosure.

Certain specific examples are described below to illustrate further some of the novel aspects of the technology described herein.

EXAMPLE 1

A composite article comprising a thermoplastic core layer including a high melt flow index resin with a melt flow index of about 100 g/10 min as measured by ASTM D1238, condition L was used. A polypropylene resin with a melt flow index of about 100 g/10 min was added with glass fibers to a pulping machine to disperse the fibers in the thermoplastic resin. The resin loading used was 30-70 wt % of the overall weight of the composite article. The dispersion that was formed was used to produce the composite article using a wet process where the dispersion was laid down on a wire mesh, and then the water was evacuated through the support structure forming a web. The web was passed through two sets of nip rollers with the first nip rollers maintained at 150° F. and providing 37 psi of pressure, and the second of nip rollers maintained at 100° F. and providing 27 psi of pressure. A surface layer was added to each side of the core layer, and the composite article was compressed by passing through a pair of nip rollers. One surface layer was a Xiro 40 gsm skin, and the other surface layer was a Mondi F7 skin.

Several physical properties of the resulting composite sheet article were measured. The total basis weight of the formed article was about 592 gsm, and the article was about 0.8 mm thick. The article was lofted to provide a modified thickness of about 5.1 mm The measurements below were made using the modified article.

A flex method that uses a support span and a downward force was used to determine the various measurements. ASTM D790 describes a standard test method where a test piece is placed across two supports and pushed down in the middle until it breaks or bends a specified distance. The plastic is molded or machined into a rectangular test piece prior to testing. During the test, the force on the test piece and how much the center is pushed down (deflection) is continuously measured. Many different test dimensions can be used but the most common is to test a ⅛ inch thick test piece laid across two supports 2 inches apart with a single loading nose in the center. Flexural strength (stress) is a measure of how much force a test bar can support before breaking and is calculated using a three point bending formula. Flexural stress at 5% strain is a measure of the force required to bend the test bar a certain amount and is used when the test bar bends too far without breaking. Flexural modulus is a measure of stiffness or rigidity and is calculated by dividing the change in stress by the change in strain at the beginning of the test.

In the testing herein, a span width was 100 mm, and a specimen of about 50 mm wide by 150 mm long was placed across the span where a downward force was applied to the top of the specimen using a nose piece at a speed of 50 mm/minute. A plot of applied load versus specimen extension was generated to determine the flexural slope. The test that used the specific parameters above is referred to in certain instances herein as a "Modified Flex Test."

The measured peak load in the machine direction was about 9 N, and the measured peak load in the cross direction was about 6.2 N. The average peak load was measured to be 7.6 N. The flexural strength of the article was measured to be 1.1 MPa and 0.7 MPa in the machine and cross directions, respectively, with an average flex strength being 0.9 MPa. The flexural tangent modulus was measured to be 119.4 MPa and 74.2 MPa in the machine and cross directions, respectively, with an average flex modulus of 95.8 MPa. The flexural slope was measured to be about 30.8 N/cm in the machine direction and about 18.9 N/cm in the cross direction with an average slope of about 24.8 N/cm.

EXAMPLE 2

A composite article comprising a thermoplastic core layer including a high melt flow index resin with a melt flow index of about 325 g/10 min as measured by ASTM D1238 was prepared. A polypropylene resin with a melt flow index of about 325 g/10 min. was added with glass fibers to a pulping machine to disperse the fibers in the thermoplastic resin. The resin loading used was 30-70 wt % of the overall weight of the composite article. The dispersion that was formed was used to produce the composite article using a wet process where the dispersion was laid down on a wire mesh, and then the water was evacuated through the support structure forming a web. The web was passed through two sets of nip rollers with the first nip rollers maintained at 150° F. and providing 45 psi of pressure, and the second of nip rollers maintained at 100° F. and providing 50 psi of pressure. A surface layer was added to each side of the core layer. One surface layer was a Xiro 40 skin, and the other surface layer was a Mondi F7 skin.

Several physical properties of the resulting composite sheet article were measured. The total basis weight of the formed article was about 603 gsm, and the article was about 1.6 mm thick. The article was lofted to provide a modified thickness of about 5.1 mm. The measurements below were made using the modified article.

The measured peak load in the machine direction was about 10.7 N, and the measured peak load in the cross direction was about 11.3 N. The average peak load was measured to be 11.0 N, a 46% increase compared to the article of Example 1. The flexural strength of the article was measured to be 1.2 MPa and 1.3 MPa in the machine and cross directions, respectively, with an average flex strength being 0.9 MPa, a 43% increase compared to the article of Example 1. The flexural tangent modulus was measured to be 141.4 MPa and 141.8 MPa in the machine and cross directions, respectively, with an average flex modulus of 141.6 MPa, a 46% increase compared to the article of Example 1. The flexural slope was measured to be about 30.8 N/cm in the machine direction and about 18.9 N/cm in the cross direction, with an average slope of about 24.8 N/cm, a 50% increase compared to the article of Example 1.

Based on the results in this Example 2, an article with a lower basis weight could be produced using the 325 g/10 min MFI resin to provide similar physical properties as those of Example 1, which would reduce the overall weight of any part produced using the article.

EXAMPLE 3

A composite article comprising a thermoplastic core layer including a high melt flow index resin with a melt flow index of about 325 g/10 min as measured by ASTM D1238 was prepared. A polypropylene resin with a melt flow index of about 325 g/10 min was added with glass fibers to a pulping machine to disperse the fibers in the thermoplastic dispersion. The resin loading used was 20-70 wt % of the overall weight of the core layer with typical loading weights in the 45-70 wt % range.

The dispersion that was formed was used to produce the composite article using a wet process where the dispersion was laid down on a wire mesh, and then the water was evacuated through the support structure forming a web. The web was passed through two sets of nip rollers with the first nip rollers maintained at 150° F. and providing 45 psi of pressure, and the second of nip rollers maintained at 100° F. and providing 50 psi of pressure. A surface layer was added to each side of the core layer. One surface layer was a Profol 88 gsm film, and the other surface layer was a Mondi F7 skin.

Several physical properties of the resulting composite sheet article were measured. The measured peak load in the machine direction was about 9.67 N. The measured peak load in the cross direction was about 7.18 N. The flexural slope was measured to be about 39.79 N/cm in the machine direction and about 24.45 N/cm in the cross direction.

EXAMPLE 4

A composite article comprising a thermoplastic core layer including a high melt flow index resin with a melt flow index of about 1300 g/10 min as measured by ASTM D1238 was prepared. A polypropylene resin with a melt flow index of about 1300 g/10 min was added with glass fibers to a pulping machine to disperse the fibers in the thermoplastic. The resin loading used was 20-70 wt % of the overall weight of the core layer with typical loading weights in the 45-70 wt % range. The dispersion that was formed was used to produce the composite article using a wet process where the dispersion was laid down on a wire mesh, and then the water was evacuated through the support structure forming a web. The web was passed through two sets of nip rollers with the first nip rollers maintained at 150° F. and providing 45 psi of pressure, and the second of nip rollers maintained at 100° F. and providing 50 psi of pressure. A surface layer was added to each side of the core layer. One surface layer was a Profol 88 gsm film, and the other surface layer was a Mondi F7 skin.

Several physical properties of the resulting composite sheet article were measured. The measured peak load in the machine direction was about 15.62 N (about 62% greater than the article of Example 3), and the measured peak load in the cross direction was about 11.53 N (about 61% greater than the article of Example 3). The flexural slope was measured to be about 59.07 N/cm in the machine direction (about 48% greater than the article of Example 3) and about 37.47 N/cm in the cross direction (about 53% greater than the article of Example 3).

EXAMPLE 5

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 635.4 grams per square meter. The density was measured to be 0.59 g/cm$^3$. The slope (using the Modified Flex Test) was found to be 33.39 N/cm in the machine direction and 22.00 N/cm in the cross direction. The peak load was measured to be 11.02 N in the machine direction and 7.76 N in the cross direction.

EXAMPLE 6

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 659.2 grams per square meter. The density was measured to be 0.62 g/cm$^3$. The slope (using the Modified Flex Test) was found to be 39.35 N/cm in the machine direction and 24.92 N/cm in the cross direction. The peak load was measured to be 10.8 N in the machine direction and 8.04 N in the cross direction.

EXAMPLE 7

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 677.65 grams per square meter. The density was measured to be 0.61 g/cm$^3$. The slope (using the Modified Flex Test) was found to be 46.75 N/cm in the machine direction and 26.85 N/cm in the cross direction. The peak load was measured to be 12.58 N in the machine direction and 8.99 N in the cross direction.

EXAMPLE 8

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 636 grams per square meter. The density was measured to be 0.64 g/cm$^3$. The slope (using the Modified Flex Test) was found to be 37.43 N/cm in the machine direction and 22.78 N/cm in the cross direction. The peak load was measured to be 11.89 N in the machine direction and 8.74 N in the cross direction.

EXAMPLE 9

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 641.2 grams per square meter. The density was measured to be 0.67 g/cm$^3$. The slope (using the Modified Flex Test) was found to be 39.55 N/cm in the machine direction and 24.21 N/cm in the cross direction. The peak load was measured to be 12.61 N in the machine direction and 8.95 N in the cross direction.

EXAMPLE 10

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 639.8 grams per square meter. The density was measured to be 0.68 g/cm$^3$. The slope (using the Modified Flex Test) was found to be 39.35 N/cm in the machine direction and 27.95 N/cm in the cross direction. The peak load was measured to be 12.28 N in the machine direction and 10.06 N in the cross direction.

EXAMPLE 11

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 644.5 grams per square meter. The density was measured to be 0.64 g/cm$^3$. The slope (using the Modified Flex Test) was found to be 40.55 N/cm in the machine direction and 28.53 N/cm in the cross direction. The peak load was measured to be 13.47 N in the machine direction and 10.45 N in the cross direction.

EXAMPLE 12

A composite article comprising a thermoplastic core layer including a high melt flow index resin with a melt flow index of about 1300 g/10 min as measured by ASTM D1238 was prepared.

Several physical properties of the resulting composite sheet article were measured. The basis weight was 644.2 grams per square meter. The density was measured to be 0.65 g/cm$^3$. The slope (using the Modified Flex Test) was found to be 33.64 N/cm in the machine direction and 24.03 N/cm in the cross direction. The peak load was measured to be 11.27 N in the machine direction and 9.51 N in the cross direction.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A thermoplastic composite article comprising a fiber reinforced thermoplastic polymer core layer comprising reinforcing fibers and a thermoplastic resin, wherein the thermoplastic composite article comprises a peak load of about 10.7 N in the machine direction, a peak load of about 11.3 N in the cross direction, a flexural strength of about 1.2 MPa in the machine direction and about 1.3 MPa in the cross direction, a flexural tangent modulus of about 141.4 MPa in the machine direction and about 141.8 MPa in the cross direction, and a flexural slope of about 30.8 N/cm in the machine direction and about 18.9 N/cm in the cross direction.

2. The composite article of claim 1, in which the core layer is permeable and comprises a density of about 0.1 gm/cm3 to about 1.8 gm/cm3.

3. The composite article of claim 1, in which the core layer comprises a porosity between about 20% to about 80% by volume of the core layer.

4. The composite article of claim 1 in which the thermoplastic resin comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof.

5. The composite article of claim 1, in which the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof.

6. The thermoplastic composite article of claim 1, further comprising at least one surface layer disposed on a surface of the fiber reinforced thermoplastic polymer core layer.

7. The thermoplastic composite article of claim 1, in which the thermoplastic resin comprises polypropylene and the fibers comprise glass fibers.

8. A thermoplastic composite article comprising a fiber reinforced thermoplastic polymer core layer comprising reinforcing fibers and a thermoplastic resin, wherein the thermoplastic composite article comprises a peak load of about 9.67 N in the machine direction, a peak load of about 7.18 N in the cross direction, a flexural slope of about 39.79 N/cm in the machine direction, and a flexural slope of about 24.45 N/cm in the cross direction.

9. The composite article of claim 8, in which the thermoplastic resin comprises polypropylene and the reinforcing fibers comprise glass fibers.

10. The composite article of claim 9, in which the resin is present at 20-70 weight percent based on the overall weight of the core layer.

11. The composite article of claim 8 in which the thermoplastic resin comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof.

12. The composite article of claim 8, in which the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof.

13. A thermoplastic composite article comprising a fiber reinforced thermoplastic polymer core layer comprising reinforcing fibers and a thermoplastic resin, wherein the thermoplastic composite article comprises a peak load of about 15.62 N in the machine direction, a peak load of about 11.53 N in the cross direction, a flexural slope of about 59.07 N/cm in the machine direction, and a flexural slope of about 37.47 N/cm in the cross direction.

14. The composite article of claim 13, in which the thermoplastic resin comprises polypropylene and the reinforcing fibers comprise glass fibers.

15. The composite article of claim 14, in which the resin is present at 20-70 weight percent based on the overall weight of the core layer.

16. The composite article of claim 13, in which the thermoplastic resin comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof.

17. The composite article of claim 13, in which the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof.

18. The composite article of claim 13, further comprising at least one surface layer disposed on a surface of the fiber reinforced thermoplastic polymer core layer.

19. A thermoplastic composite article comprising a fiber reinforced thermoplastic polymer core layer comprising reinforcing fibers and a thermoplastic resin, wherein the thermoplastic composite article comprises a basis weight of about 603 grams per square meter to about 677.65 grams per square meter, a density of about 0.59 $g/cm^3$ to about 0.68 $g/cm^3$, a flexural slope of about 30.8 N/cm to about 59.07 N/cm in the machine direction, a flexural slope of about 18.9 N/cm to about 37.47 N/cm in the cross direction, a peak load of about 9.67 N to about 15.62 N in the machine direction, and a peak load of about 7.18 N to about 11.53 N in the cross direction.

20. The composite article of claim 19, in which the core layer is permeable and comprises a density of about 0.1 $gm/cm^3$ to about 1.8 $gm/cm^3$ and comprises a porosity of between about 20% to about 80% by volume of the core layer.

21. The composite article of claim 19, in which the thermoplastic resin comprises polypropylene and the reinforcing fibers comprise glass fibers.

22. The composite article of claim 19, in which the thermoplastic resin comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof.

23. The composite article of claim 19, in which the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof.

24. The thermoplastic composite article of claim 21, further comprising at least one surface layer disposed on a surface of the fiber reinforced thermoplastic polymer core layer.

* * * * *